US009018345B2

(12) United States Patent
Kunst et al.

(10) Patent No.: US 9,018,345 B2
(45) Date of Patent: Apr. 28, 2015

(54) PROCESS FOR THE PREPARATION OF POLYETHERESTER POLYOLS

(75) Inventors: Andreas Kunst, Ludwigshafen (DE); Berend Eling, Lemfoerde (NL); Achim Loeffler, Speyer (DE); Xinkui Wang, Taiyuan (CN); Ning Ying, Taiyuan (CN); Hui Du, Taiyuan (CN); Maoqing Kang, Taiyuan (CN)

(73) Assignee: BASF SE, Ludwigshafen (DE)

( * ) Notice: Subject to any disclaimer, the term of this patent is extended or adjusted under 35 U.S.C. 154(b) by 133 days.

(21) Appl. No.: 13/817,988

(22) PCT Filed: Aug. 20, 2010

(86) PCT No.: PCT/CN2010/076197
§ 371 (c)(1),
(2), (4) Date: Feb. 20, 2013

(87) PCT Pub. No.: WO2012/022048
PCT Pub. Date: Feb. 23, 2012

(65) Prior Publication Data
US 2013/0211041 A1    Aug. 15, 2013

(51) Int. Cl.
*C08G 65/04* (2006.01)
*C08G 63/85* (2006.01)
*C08G 65/26* (2006.01)

(52) U.S. Cl.
CPC ............ *C08G 63/85* (2013.01); *C08G 65/2603* (2013.01); *C08G 65/2663* (2013.01)

(58) Field of Classification Search
USPC ........................................................ 528/410
See application file for complete search history.

(56) References Cited

U.S. PATENT DOCUMENTS

| | | | |
|---|---|---|---|
| 3,404,109 A | 10/1968 | Milgrom | |
| 3,427,256 A | 2/1969 | Milgrom | |
| 3,427,334 A | 2/1969 | Belner | |
| 3,427,335 A | 2/1969 | Herold | |
| 3,829,505 A | 8/1974 | Herold | |
| 3,941,849 A | 3/1976 | Herold | |
| 4,472,560 A | 9/1984 | Kuyper et al. | |
| 4,477,589 A | 10/1984 | Van Der Hulst et al. | |
| 4,826,887 A | 5/1989 | Kuyper et al. | |
| 5,032,671 A | 7/1991 | Harper | |
| 5,158,922 A | 10/1992 | Hinney et al. | |
| 5,319,006 A | 6/1994 | Yang et al. | |
| 5,436,313 A | 7/1995 | Klang et al. | |
| 5,470,813 A | 11/1995 | Le-Khac | |
| 5,482,908 A | 1/1996 | Le-Khac | |
| 5,525,702 A * | 6/1996 | Nace ............................ 528/354 |
| 5,545,601 A | 8/1996 | Le-Khac | |
| 5,696,225 A | 12/1997 | Cai et al. | |
| 6,066,683 A | 5/2000 | Beisner et al. | |
| 6,569,352 B1 | 5/2003 | Hillshafer et al. | |
| 6,753,402 B1 | 6/2004 | Bauer et al. | |
| 2006/0211830 A1 | 9/2006 | Lorenz et al. | |
| 2006/0223979 A1* | 10/2006 | Ostrowski et al. ............. 528/425 |
| 2007/0088146 A1 | 4/2007 | Nakamura et al. | |
| 2007/0265367 A1* | 11/2007 | Le-Khac et al. ................. 522/96 |
| 2008/0021154 A1 | 1/2008 | Haider et al. | |
| 2008/0125569 A1* | 5/2008 | Wehmeyer et al. ........... 528/361 |
| 2013/0023700 A1 | 1/2013 | Chilekar et al. | |

FOREIGN PATENT DOCUMENTS

| | | |
|---|---|---|
| CN | 1303402 | 7/2001 |
| CN | 101511909 | 8/2009 |
| CN | 101831064 | 9/2010 |
| EP | 0 700 949 | 3/1996 |
| EP | 0 743 093 | 11/1996 |
| EP | 0 761 708 | 3/1997 |
| EP | 1 916 273 | 4/2008 |
| JP | 4 145123 | 5/1992 |
| WO | 97 17388 | 5/1997 |
| WO | 97 40086 | 10/1997 |
| WO | 98 16310 | 4/1998 |
| WO | 00 47649 | 8/2000 |
| WO | 2007 020879 | 2/2007 |

OTHER PUBLICATIONS

International Search Report Issued Jun. 2, 2011 in PCT/CN10/76197 Filed Aug. 20, 2010.

* cited by examiner

*Primary Examiner* — Michael L Leonard
(74) *Attorney, Agent, or Firm* — Oblon, McClelland, Maier & Neustadt, L.L.P.

(57) ABSTRACT

Disclosed is a process for the preparation of polyetherester polyols prepared with hybrid catalysts, the polyetheresters obtained from the process and the use of such materials in polyurethane applications. The hybrid catalysts used in this invention comprise double metal cyanide complex catalysts (DMC) and at least one co-catalyst.

19 Claims, No Drawings

PROCESS FOR THE PREPARATION OF POLYETHERESTER POLYOLS

CROSS REFERENCE TO RELATED APPLICATION

This application is a 371 of PCT/CN2010/076197, filed on Aug. 20, 2010.

FIELD OF THE INVENTION

The present invention relates to the preparation of polyetherester polyols. In particular, the invention discloses the use of novel hybrid catalysts for making uniform polyetherester polyols by copolymerization of at least one alkylene oxide with certain cyclic compounds. The claimed polyetherester polyols are useful inter alia for synthesizing novel polyurethane materials, in particular polyurethane elastomers.

BACKGROUND OF THE INVENTION

Generally, polyurethanes are multi-block polymers, usually consisting of soft segments derived from polyols, and hard segments arising from isocyanates and extenders. Because the polyols generally constitute the majority of the formulation weight, the final properties of polyurethane products are largely determined by the polyols. Therefore, much attention has been paid to the polyol manufacture. A great polyol variety can be used to build the polyurethane polymeric architecture, and the most widely employed polyols are polyether and polyester polyols. However, they are plagued by a number of demerits and have limited applications in some fields. For example, although polyether based polyurethanes exhibit good stability against hydrolysis, they suffer from poor strength properties and heat resistance. In contrast with these, polyester based polyurethanes show good mechanical performance and heat stability, however, the susceptibility to hydrolysis is a primary problem requiring solution.

To integrate respective merits and remedy the respective disadvantages originating from the conventional polyether and polyester polyols, both ether and ester linkages containing polyetherester polyols enjoy growing interest recently. They are expected to have a more attractive performance than the separate polyether or polyester polyols. Furthermore, the polyetherester polyols could be used alone, or in combination with the conventional polyols for polyurethane production, therefore extending the polyol source.

Simple blending of a polyether and a polyester is not an option for solving the mentioned problems, due to their incompatibility in nature. To date, various synthetic routes for the preparation of different polyetherester polyols have been proposed. Some representative methodologies are summarized as follows: (1) catalytic addition of alkylene oxides onto polyester polyols using double metal cyanide complex (DMC) catalyst, for example see U.S. Pat. No. 6,753,402; (2) Polyether reacts with dicarboxylic acid or anhydride with the aid of different catalysts to implement the insertion of anhydride into carbon-oxygen bonds of polyether, as disclosed in U.S. Pat. Nos. 5,319,006, 5,436,313, and 5,696,225; (3) Anhydride first reacts with diol to form an intermediate polyester polyol, followed by the reaction with an alkoxylating agent, for example see U.S. Pat. No. 6,569,352; (4) Copolymerization of $CO_2$, alkylene oxide, initiator, for example see U.S. Pat. Application 20080021154; (5) Copolymerization of anhydride, alkylene oxide and alcohol initiator, as described in U.S. Patent Application No. 20070265367 and by D X Wang et al in "Synthesis, Characterization, and Properties of Novel Polyetherester Polyols and Developed Polyurethanes" J Appl Polym Sci vol 103, 417-424 (2007). (6) Reaction of hydroxyl group-containing monocarboxylic acid esters and/or polycarboxylic acid esters with alkylene oxide followed by transesterfication as described in U.S. Patent Application No. 20060211830.

In addition, polyetheresters can be produced by the copolymerization of alkylene oxide and cyclic esters such as lactone in the presence of a suitable initiator, as described in U.S. Pat. No. 5,032,671 or U.S. Patent Application 20070088146 or International Application No. 2007020879 and references cited therein. In the preparation of such polyetheresters, catalyst choice is crucial.

DMC complex is known as a catalyst with an extraordinarily high activity for alkylene oxide polymerization. The polyether polyol gained thereby is characterized by low unsaturation and narrow molecular weight distribution (MWD) in comparison with common polyether synthesized using a traditional KOH catalyst. Besides, it can be used to produce other polymers encompassing polyester polyols and polyetherester polyols. Recent improvements in preparative methodology have made DMC catalyst much more attractive for commercial manufacture.

Though DMC has proved very efficacious for the copolymerization, drawbacks still exist. For example, the catalyst is hindered by the observation that the products obtained often are turbid or layered. Such products are incompetent because the inhomogeneity not only affects the appearance, but also damages the performance of final polyurethane materials (see Example 5 below). It is demonstrated by our experiments that the undesirable phenomena are closely associated with the catalyst employed.

Thus, the problem to be solved is to provide a modified catalyst system for use in a process for the production of polyetherester polyols. Preferably, the catalyst would be successful in the synthesis of uniform polyetherester polyols. Uniform here means that the monomers are evenly distributed over the polymer chain, the chain being free of defects. Defects could arise from e.g. non-complete conversion or side reactions like e.g. decarboxylation leading to polyols that have a real functionality less than the theoretical value. The uniform telechelic polyether-ester polyols that are free from chain defects would preferably also show improved mechanical properties and swelling characteristics when applied in making a polymer.

SUMMARY OF THE INVENTION

The problem mentioned above is solved by the features of the present invention, as expressed in the claims.

Surprisingly, the problems mentioned above can be alleviated or resolved by combining a second catalyst with DMC complex.

The present invention provides a method to overcome the turbidity and stratification of polyetherester polyols obtained via the copolymerization of alkylene oxide with cyclic compounds, for example cyclic esters (lactones) and/or cyclic anhydrides, and an initiator using a conventional single DMC complex as catalyst. The method of the present invention involves the use of a novel hybrid catalyst, substituting DMC alone to implement the synthesis. The new hybrid catalyst according to the present invention comprises at least one DMC catalyst and at least one co-catalyst. The polyetherester polyols obtained employing the novel hybrid catalyst exhibit advantages in performance over their counterparts made using solely a DMC catalyst, especially in the synthesis of polyurethane elastomers, in particular regarding its swelling behavior. The polyetherester polyols thus described and so produced can therefore be advantageously used in the manufacturing of polyurethanes, notably polyurethane elastomers.

DETAILED DESCRIPTION OF THE INVENTION

The present invention provides a novel hybrid catalyst which accomplishes the synthesis of uniform polyetherester polyols by copolymerization of alkylene oxide (first monomer) and cyclic compounds and/or carbon dioxide (co-monomer), as defined in the claims, for example cyclic esters (e.g. lactones, lactide) and/or cyclic anhydrides, with the participation of an initiator.

According to a preferred embodiment of this invention, the hybrid catalyst consists of at least one primary catalyst, in particular a DMC complex, and at least one co-catalyst.

The object of the present invention thus is a process for the synthesis of polyetherester polyols by copolymerizing at least one alkylene oxide with carbon dioxide and/or at least one cyclic compound of the general formula

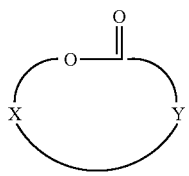

wherein X is selected from the group comprising C=O, CR1R2, wherein R1 and R2 are independently selected from the group comprising H, alkyl, aryl,
and wherein Y is selected from the group comprising —(CR3R4)m-, —(CR5=CR6)n-,

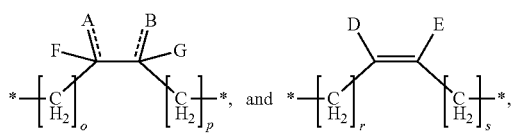

wherein A and B are independently hydrogen, methylene or a C2-C100 aliphatic compound, or wherein A is

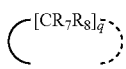

and B is a bond,
and wherein D and E are independently hydrogen or a C1-C100 aliphatic compound,
or wherein D is

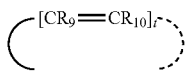

and E is a bond,
and wherein F and G are independently hydrogen or are not present,
wherein m is an integer in the range from 0 to 5, and wherein n is an integer in the range from 0 to 5, and wherein R3 and R4 are independently selected from the group comprising hydrogen, methylene, alkyl, aryl,
wherein R5 and R6 are independently selected from the group comprising hydrogen, alkyl, aryl,
and wherein o, p, q, r, s, t independently are integers in the range from 0 to 5,
and wherein R7, R8, R9, R10 are independently selected from the group comprising hydrogen, alkyl, aryl,
in the presence of at least one initiator and at least one hybrid catalyst.

Further objects of the present invention are also the inventive hybrid catalyst, as defined in the claims, and the use of the inventive hybrid catalyst, as defined in the claims, in a process for the production of polyetherester polyols.

Furthermore, a polyetherester polyol, obtainable by the inventive process, and the use of said polyetherester polyols, in polyurethane formulations or as surfactants, dispersants or lubricants or as macromers for the preparation of polymer-filled polyols, or in unsaturated polyester-styrene resin (USP) formulations, are also objects of the present invention.

In a preferred embodiment of the invention, X is C=O.

In another preferred embodiment of the invention, Y is selected from the group comprising:
—(CR3R4)m-, wherein m=2,
—(CR5=CR6)n-, wherein n=1,

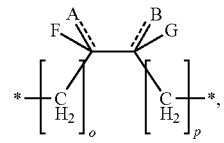

wherein o and p are each 0 and A and B are independently selected from the group comprising C16 aliphatic compounds, C18 aliphatic compounds, or wherein A is

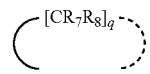

and B is a bond, wherein q=4 and R7 and R8 are each hydrogen,

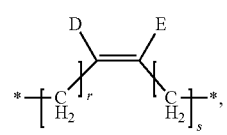

wherein r and s are each 0, D and E are each hydrogen or wherein D is

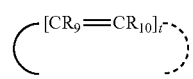

and E is a bond, wherein t=2 and R9 and R10 are each hydrogen.

In a particularly preferred embodiment of the invention, Y is

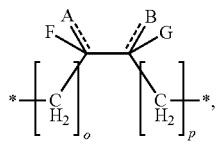

wherein o and p are each 0, A is hydrogen and B is methylene, or wherein A is methylene and B is hydrogen, and wherein F is hydrogen if A is hydrogen, and wherein F is not present if A is methylene, and wherein G is hydrogen if B is hydrogen, and wherein G is not present if B is methylene.

In another preferred embodiment of the invention, X is CR1R2.

In a particularly preferred embodiment of the invention, R1 and R2 are each hydrogen, and Y is —(CR3R4)$_m$—, and m is 3 or 5, and R3 and R4 are each hydrogen.

In a preferred embodiment of the inventive process, the hybrid catalyst comprises at least one double metal cyanide complex catalyst (DMC catalyst) and at least one co-catalyst.

In an embodiment of the inventive process, one alkylene oxide is used.

In another embodiment of the inventive process, one cyclic compound is used.

In another embodiment of the inventive process, one initiator is used.

In another embodiment of the inventive process, one hybrid catalyst is used.

In a preferred embodiment of the inventive process, the hybrid catalyst consists of one DMC catalyst and at least one co-catalyst.

In another preferred embodiment of the inventive process, the hybrid catalyst consists of at least one DMC catalyst and one co-catalyst.

In another preferred embodiment of the inventive process, the hybrid catalyst consists of one DMC catalyst and one co-catalyst.

For the present invention, the DMC catalyst may be synthesized by virtue of generally known methods, usually by combining aqueous solutions of a metal salt and metal cyanide salt in the presence of an organic ligand to form a precipitate of a DMC compound. Although it is possible to use all types of DMC catalysts known from the prior art such as Co—Zn, Fe—Zn, and Ni—Zn based DMC catalysts, or mixtures thereof, a Co—Zn based DMC catalyst which has the general formula Zn$_3$—[Co(CN)$_6$]$_2$ is preferably adopted for the present process.

For example, Co—Zn, Fe—Zn, and/or Ni—Zn-based double metal cyanide complex catalysts may be used as DMC catalyst. Preferably, zinc hexacyanocobaltate catalysts as described for example in EP 1 916 273 A1, U.S. Pat. Nos. 3,404,109, 3,427,256, 3,427,334, 3,427,335, 3,829,505, 3,941,849, 4,472,560, 4,477,589, 5,158,922, 5,470,813, 5,482,908, 5,545,601, EP 0 700 949, EP 0 743 093, EP 0 761 708; WO 97/40086, WO 98/16310, WO 00/47649 and JP 4 145 123 may be used.

The DMC catalyst is usually present in the hybrid catalyst of the present invention in an amount within the range of from 5 to 2000 ppm based on the mass of polyetherester polyols formed, more preferably from 20 to 250 ppm based on the mass of polyetherester polyols formed, and most preferably from 50 to 150 ppm based on the mass of polyetherester polyols formed.

It is assumed that the function of the co-catalyst in the hybrid catalyst is to favor the ring-opening of certain cyclic compounds, like cyclic esters and/or cyclic anhydrides, and to facilitate their incorporation into the copolymer chain.

The co-catalyst may be selected from the group of condensation catalysts. Compounds catalyzing esterification or transesterification reactions are suitable as co-catalysts.

Inter alia, the co-catalyst may be selected from the group comprising Lewis acids, organo-tin carboxylates, titanium, vanadium and hafnium compounds, metal alkoxides, aryloxides containing aluminum, lithium, titanium and lanthanides.

Among them, preferable catalysts are titanium compounds, organo-tin carboxylates, metal alkoxides. The most preferable are titanium compounds with the general formula Ti(OR)$_4$, in which R is an alkyl group with 1-4 carbon atoms. Representative examples of the compounds include, but are not limited to, tetraethyl titanate, tetraisopropyl titanate, and tetratert-butyl titanate, or mixtures thereof.

The co-catalyst may also be selelected from the group of titanium, zirconium or hafnium compositions, preferably a titanium or zirconium composition, said composition being a complex of at least one metal selected from the group consisting of titanium, zirconium and hafnium and an acetoacetate ester in which the molar ratio of Ti, Zr or Hf to acetoacetate ester is in the range 1:2.5 to 1:10 and said acetoacetate ester is an ester of an alcohol containing 1 to 6 carbon atoms, as described inter alia in WO 00/02941.

The co-catalyst may also be selected from the group containing compositions comprising an organic compound derived from a metal of Group IVB of the Periodic Table of Elements, said organic compound being a metal carboxylate or metal alkoxide or a chelate complex with the metal as central atom and at least one polydentate ligand, as described inter alia in WO 97/17388.

Preferably, the co-catalyst is selected from the group comprising titanium alkoxides.

The ratio of DMC to second catalyst (D/S ratio) is another important factor of the present invention, apart from the composition of the hybrid catalyst. Higher D/S ratios sometimes do not lead to uniform polyetherester polyols. Lower D/S ratio are also sometimes not appropriate, and may have a negative impact on subsequent polyurethane synthesis. Usually, the DMC catalyst is present in an amount of 5 to 2000 ppm, whereas the co-catalyst is present in an amount of 1 to 1000 ppm, each with respect to the total mass of the final product. Preferably, the DMC catalyst is present in an amount of 20 to 250 ppm, whereas the co-catalyst is present in an amount of 1 to 100 ppm, each with respect to the total mass of the final product. More preferably, the DMC catalyst is present in an amount of 50 to 150 ppm, whereas the co-catalyst is present in an amount of 1 to 60 ppm, each with respect to the total mass of the final product.

The hybrid catalyst can be prepared in different ways such as impregnation, co-precipitation, physically mixing and so on. Physical mixing of the DMC and second catalyst to obtain a hybrid catalyst is preferably used in the present invention due to its simple preparation manner and excellent actual effect.

The given amounts of DMC and co-catalyst may be added to the reaction at once at the start of the reaction, but may also be added one after the other at different stages of the reaction. In this manner it is possible to selectively modify the chain architecture which may lead to further improved properties.

Examples of appropriate alkylene oxides include, but are not limited to, ethylene oxide, propylene oxide, butylene oxide (e.g. 2,3-butylene oxide, 1,2-butylene oxide), pentene oxide (e.g. 1,2-pentene oxide, 2,3-pentene oxide), cyclohexene oxide, glycidyl ether, glycidyl-(meth)crylate, allyl glycidyl ether, phenyl glycidyl ether, phenyl glycidyl ether, butadiene monoxide, hexane oxide, stryrene oxide, glycidole, epichlorohydrine, propionic acid methylester oxide, oxetane, or mixtures thereof.

Preferably, the alkylene oxide is selected from the group containing ethylene oxide, propylene oxide, 1,2-butylene oxide, or mixtures thereof. Particularly preferred alkylene oxides for the inventive process are ethylene oxide (EO) and/or propylene oxide (PO).

Usually, the molar ratio of PO:EO is from 0:100 to 100:0. Preferably, the molar alkylenoxide (AO):co-monomer (cyclic compound) ratio is from 100:0 to 20:80 in case of cyclic esters, and from 0:100 to 50:50 in case of cyclic anhydrides.

The monomers may be provided at the beginning of the reaction or may be continuously dosed. The monomers may be added statistically or block-wise. The monomers may be dosed with varying flow rates (dynamic dosing). The monomers may, if necessary, also be dissolved in suitable solvents, and then provided at the beginning as a whole, or alternatively added to the reactor later.

In general, all cyclic ester compounds applicable in the ring-opening polymerization of the cyclic esters can be used as second monomer (cyclic compound) according to the present invention. Examples of such lactones include, but are not limited to, ε-caprolactone, δ-valerolactone, γ-butyrolactone, β-methyl-δ-valerolactone and so on. Preferred examples of such lactones are ε-caprolactone, δ-valerolactone, and γ-butyrolactone, or mixtures thereof. Most preferably, ε-caprolactone and δ-valerolactone are applied as co-monomer for the present synthesis.

Examples of cyclic anhydrides which may be used in the copolymerization with the alkylene oxide include, but are not limited to maleic anhydride, itaconic anhydride, succinic anhydride and/or substituted derivates thereof, phthalic anhydride, tetrahydrophthalic anhydride and diglycolic anhydride.

In a preferred embodiment of the invention, the alkylene oxide is copolymerized together with the cyclic compound in the presence of an initiator.

Initiators containing active hydrogen atoms may be involved in the starting materials. Preferable initiators according to the present invention include H-acidic initiators with a functionality ranging from 1-12H-acidic atoms per molecule, for example polyoxyethylene polyols, polyoxypropylene polyols, polytetatramethylene ether glycols, and the like with adequate molecular weight. Initiators with lower molecular weight are not recommended because they can hardly initiate the copolymerization. Exorbitant molecular weight results in lower production capability. The preferred molecular weight of the initiator is between 200 to 2000, particularly preferred 300 to 1000. If low molecular weight initiators are applied, those initiators need to be continuously fed into the reactor in order to avoid the deactivation of the DMC catalyst.

The initiator may, inter alia, be selected from the group containing monols and polyols.

Preferably, the initiator is selected from the group containing methanol, butanol, hexanol, heptanol, octanol, decanol, undecanol, dodecanol, tridecanol, tetradecanol, pentadecanol, xexadecanol, heptadecanol, octadecanol, ethylene glycol, propylene glycol, diethylene glycol, polyethylene glycol, dipropylene glycol, polypropylene glycol, 1,3-propane diol, 1,4-butane diol, neopentyl glycol, 1,5-pentane diol, 3-methyl-1,5-pentane diol, 1,6-hexane diol, 1,9-nonane diol, 2-methyl-1,8-octane diol, cyclohexane diol, dichloro hexane dimethanol, glycerine, trimethylol propane, trimethylol ethane, pentaerythrit, sucrose, saccharose, glucose, fructose, mannose, sorbitol, dipentaerythrit, tripentaerythrit, polyesters, like polyesters based on caprolactone or 1,4-butane diole and adipic acid, initiators based on renewable resources, like fats containing hydroxyl groups, e.g. castor oil, natural oils modified with hydroxyl groups, like sunflower oil, soybean oil, rapeseed oil, palm oil, and/or fatty acid ester containing hydroxyl groups, like hydroxyl alkyl stearate, hydroxyl alkyl oleate, hydroxyl alkyl linolate, hydroxyl alkyl linoleoate, in particular methyl ester or ethyl ester of hydroxyl fatty acids, lignin and its salts, like lignin sulfonate, polysaccharides, like starch, cellulose, guar.

The initiators may be provided at the beginning of the reaction as a whole, or may be continuosly dosed together with the alkylene oxide(s) and the co-monomer(s).

The copolymerization temperature is preferably between 80 and 220° C., more preferably between 100-180° C., even more preferably between 100-160° C. and particularly preferred between 130-160° C.

If the cyclic compound is a cyclic ester, the temperature is usually in the range of 150 to 170° C.; if the cyclic compound is a cyclic anhydride, the temperature usually is between 120 and 140° C.

The temperature may also be varied during the process.

If the temperature is too low, the reaction rate might be reduced too much; while at a too high reaction temperature, the risk of unwanted side reaction significantly reducing yield will increase.

The copolymerization time depends on the other reaction conditions and can be determined in orienting experiments. Typically, the reaction time is less than or equal to 24 hours; preferably, less than or equal to 15 hours; more preferably, less than or equal to 10 hours.

The pressure during the inventive process usually lies in the range of 2 to 20 bar. The reaction is usually performed in an inter atmosphere (e.g. under nitrogen or argon).

The reaction may be performed in a batch, semi-batch or continuous manner. For example, the reactor may be a stirrer vessel or a tube reactor or a cascade of stirrer vessels.

The presence of the co-catalyst may cause an increased reactivity of the polyol. Such a behavior can be desired, but in applications where this is not acceptable the co-catalyst can be removed by addition of water. The co-catalyst will react with the water and the corresponding oxide is formed. The oxide can then be removed from the mixture using conventional techniques like filtration.

Optionally, solvents may be used in the inventive process. Preferred solvents are selected from the group comprising benzene, toluene, xylene, tetrahydrofurane, 1,3-dioxane, 1,4-dioxane, trioxane, dimethylacetoamide, dimethylformamide, dimethylsulfoxide.

In order to reduce the amount of free alkylene oxide, an after-reaction may be performed until the pressure in the reactor is constant. Before or during the after-reaction phase, further catalyst and/or co-catalyst may optionally be dosed. Before or during the after-reaction phase, the temperature may optionally be varied, with respect to the actual reaction temperature.

After the reaction has been finished, the product is usually stripped of volatile components, e.g. by nitrogen stripping, vacuum stripping, or steam stripping. Usually, the residual alkylene oxide content of the product after the stripping lies under 50 ppm.

The polyetherester polyol which may be obtained by the inventive process usually has an OH-number within the range of 10 to 350 mg KOH/g and a functionality of 1 to 12. Normally, the inventive polyetherester polyol has a molecular weight of 400 to 20000 g/mol, a viscosity of 50 to 50000 mPas and a polydispersity of 1.01 to 1.9.

The polyetherester polyol according to the invention may of course also be stabilized with any of the stabilizers commonly used for stabilizing polyetherols, e.g. with substituted phenol derivatives.

Polyetherester polyols made according to the present invention may be reacted with polyisocyanate, followed by extending the isocyanate-terminated prepolymer with a chain extender offering polyurethane elastomers. The polyisocyanates may be selected from the group comprising aliphatic, cycloaliphatic, arylaliphatic and aromatic isocyanates. Among them, aromatic polyisocyanates are preferred. Examples of suitable aromatic isocyanates include 2,4'-, 2,6-isomers of toluene diisocyanate (TDI), 4,4'-, 2,4' and 2,2'-isomers of diphenylmethane diisocyante (MDI), or mixtures thereof.

The chain extenders for use in the present invention may be selected from the group comprising low-molecular polyhydric alcohols known in the art. They include ethylene glycol, diethylene glycol, 1,4-butanediol, and glycerin, or mixtures of thereof. It has been surprisingly found that polyurethane elastomers from polyetherester polyols prepared according to the inventive method using hybrid catalyst systems exhibit improvements regarding the swelling behavior in water compared to polyetherester polyols prepared by conventional single DMC-catalyst technology.

The polyetherester polyols obtainable by the inventive process may be used in a variety of applications. Inter alia, the may be used for the production of polyurethane (PU) foams, like microcellular foams, flexible foams, formed flexible foams, viscoelastic foams, rigid foams for construction or insulation applications, or PU elastomers, thermoplastic polyurethanes (TPU), PU coatings, PU sealants, PU adhesives, surfactants, lubricants, dispersants, as macromers for the production of polymer polyols, as macromers for aqueous polymer dispersions, as macromer for the production of comb polymers which may be used as concrete liquefiers.

For the further understanding of the invention, the following examples are given for purpose of illustration only and should not be regarded as limiting in any way.

EXAMPLES

The preparation of polyetherester polyols was carried out in a stainless steel autoclave with an inner volume of 500 cm$^3$ or 5000 cm$^3$, respectively. In all of the experiments, comonomer, initiator, and catalyst were first charged into the reactor. By flushing the reactor with $N_2$, the air within the autoclave was replaced. The reactor was then heated to the desired temperature. After the completion of introduction of alkylene oxide in a successive manner, the reaction was continued for an additional several hours. At the end of the reaction, the conversion of the cyclic esters and/or the cyclic anhydrides was calculated based on the weight of materials and results of GPC analysis, while identification of the products was performed by FT-IR, $^1$H-NMR and $^{13}$C-NMR.

Example 1

The initiator (polyoxypropylene diol, 300 mg KOH/g, 46.7 g), ϵ-caprolactone monomer (25 g), hybrid catalyst (DMC 0.0313 g and Ti(OBu)$_4$ 0.0188 g) were charged into a stainless steel autoclave. The reactor was then heated to 160° C. in a nitrogen atmosphere, and propylene oxide (PO, 53.3 g) was successively introduced during 3 hours. The reaction was continued for an extra 2 hours at this temperature. After the completion of the reaction, a uniform product was obtained. The conversion of ϵ-caprolactone was 99%, the hydroxyl value was 113.3 mg KOH/g and the structure of the product was confirmed to be the desired poly (PO-co-CL) diol by FT-IR, $^1$H-NMR, and $^{13}$C-NMR.

Example 2

Reference Example

Analogous to Example 1, except that a conventional single DMC catalyst (0.0313 g) was used instead of the inventive hybrid catalyst. A layered product was obtained in the end of the reaction and the conversion of ϵ-caprolactone was 99% and the hydroxyl value was 114.0 mg KOH/g.

Example 3

The initiator (polyoxypropylene triol, 400 mg KOH/g, 504 g), ϵ-caprolactone monomer (809 g), hybrid catalyst (DMC 1.2 g and Ti(OBu)$_4$ 0.12 g) were charged into a stainless steel autoclave. The reactor was then heated to 160° C. in a nitrogen atmosphere, and a mixture of propylene oxide (PO, 2100 g) and ethylene oxide (EO: 615 g) was successively introduced during 3 hours. The reaction was continued for an extra 2 hours at this temperature. After the completion of the reaction, a uniform product was obtained. The conversion of ϵ-caprolactone was 99%, the hydroxyl value was 50 mg KOH/g and the structure of the product was confirmed to be the desired poly (PO-co-EO-co-CL) triol by FT-IR, $^1$H-NMR, and $^{13}$C-NMR.

Example 4

The initiator (polyoxypropylene diol, 250 mg KOH/g, 917.9 g), ϵ-caprolactone monomer (906.9 g), hybrid catalyst (DMC 1.36 g and Ti(OBu)$_4$ 0.45 g) were charged into a stainless steel autoclave. The reactor was then heated to 160° C. in a nitrogen atmosphere, and propylene oxide (PO, 2707.9 g) was successively introduced during 3 hours. The reaction was continued for an extra 2 hours at this temperature. After the completion of the reaction, a uniform product was obtained. The conversion of ϵ-caprolactone was 99%, the hydroxyl value was 51.6 mg KOH/g and the structure of the product was confirmed to be the desired poly (PO-co-CL) diol by FT-IR, $^1$H-NMR, and $^{13}$C-NMR.

Example 5

Reference Example

Similar to Example 4, except that a conventional single DMC catalyst (1.36 g) was used instead of an inventive hybrid catalyst. A layered product was obtained in the end of the reaction and the conversion of ϵ-caprolactone was 99% and the hydroxyl value was 50.2 mg KOH/g.

Example 6

The initiator (polyoxypropylene diol, 250 mg KOH/g, 897 g), phthalic anhydride monomer (PA: 593 g), hybrid catalyst (DMC 1.67 g and Ti(OBu)$_4$ 0.49 g) were charged into a stainless steel autoclave. The reactor was then heated to 130° C. in a nitrogen atmosphere, and the propylene oxide (PO, 3426 g) was successively introduced during 3 hours. The reaction was continued for an extra 2 hours at this temperature. After the completion of the reaction, a uniform and clear product was obtained. The conversion of phthalic anhydride was 99%, the hydroxyl value was 46.8 mg KOH/g and the structure of the product was confirmed to be the desired poly (PO-co-PA) diol by FT-IR, $^1$H-NMR, and $^{13}$C-NMR.

Example 7

Reference Example

Similar to Example 6, except that a conventional single DMC catalyst (1.23 g) was used instead of an inventive hybrid catalyst. A turbid product was obtained in the end of the reaction and the conversion of phthalic anhydride was 99%, and the hydroxyl value was 46.1 mg KOH/g.

Polyurethane Elastomers prepared from the inventive polyetherester polyols Method to produce the polyurethane samples:

A) Materials Used:
Byk 080 Defoamer, Byk GmbH, Wesel, Germany
Thorcat 535 Mercury based catalyst, Thor Chemie, Speyer, Germany
1,4 Butanediol Chain extender, BASF SE, Ludwigshafen, Germany
Isocyanate A mixture of Lupranat® MP102 and Lupranat® MM103, obtainable from BASF SE, at a weight ratio of 1/1. Lupranat® MP102 is a prepolymer based on 4,4'MDI and a glycol mixture with an NCO value of 23.0%. Lupranat® MM103 is a carbodiimide-modified 4,4' MDI with an NCO value of 29.5%. The mixture has an NCO value of 26.2%.

B) Method to Produce the Polyurethane Samples:

The reaction components and additives were stored and applied at room temperature. After the Polyol containing component (A component, see Table) was produced it was left for 20 minutes to entrain most of the entrapped air bubbles. The added amount of isocyanate was calculated such, that the isocyanate index amounted to 99.9. The A component was mixed with the isocyanate for 60 s in a speed Mixer. The mixture was poured into an open mould with dimensions of 15*20*0.6 cm^3. The mould temperature amounted to 70° C. The sample was removed from the mould after half an hour of cure. Subsequently the sample was post cured for 4 hours 80° C. After post cure the sample was stored at room temperature for at least a day. Prior to testing the sample was split into three slabs, the core slab having a thickness of 2 mm. The core slab was submitted to physical testing.

Swelling Measurement:

From the core slab with a thickness of 2 mm a sample was cut with dimensions of 4×4 cm^2 and its mass (m1) was determined. The sample was put into a metal sample holder. An open top container was filled with water approx. 2.5 L of water in which the sample holder with sample was placed such that the test specimen was fully submerged. The container with sample was put into an oven at 100° C. and left for 5 h. Subsequently the sample was taken out of the hot water bath. The warm sample was gently dried using filtration paper. After having cooled down to room temperature the sample weight was determined (m2). The degree of swelling was calculated using the following equation:

$$((m2-m1)/m1)\times 100\%)$$

The experimental error is less than 0.1%; measured differences of more than 0.2% are significant.

Physical Testing:

The polyurethane castings were submitted to the following mechanical tests.

| Property | Norm |
|---|---|
| density | ISO 1183-1, A |
| shore hardness (A) | DIN 53505 |
| tensile strength at break | DIN 53504 |
| elongation at break | DIN 53504 |
| tear resistance | ISO 1183-1, A |
| abrassion | DIN 53503 |

Results:

| Polyurethane casting | | 1 | 2 | 3 | 4 |
|---|---|---|---|---|---|
| Polyol component | | | | | |
| Thorcat 535 | Parts by weight | 0.7 | 0.7 | 0.7 | 0.7 |
| BYK-080 | Parts by weight | 0.3 | 0.3 | 0.3 | 0.3 |
| 1,4-Butanediol | Parts by weight | 4.0 | 4.0 | 4.0 | 4.0 |
| Polyol example 4 | Parts by weight | 95 | | | |
| Polyol example 5 | Parts by weight | | 95 | | |
| Polyol example 7 | Parts by weight | | | 95 | |
| Polyol example 6 | Parts by weight | | | | 95 |
| Visual appearance of casting | | transparent | transparent | transparent | transparent |
| open time | min | 5.00 | 5.15 | 5.30 | 5.30 |
| Mechanical properties | | | | | |
| density | g/cm^3 | 1,084 | 1,088 | 1,107 | 1,107 |
| shore hardness (A) | MPa | 49 | 54 | 51 | 48 |
| tensile strength at break | MPa | 18 | 19 | 21 | 18 |
| elongation at break | % | 730 | 650 | 730 | 840 |
| tear resistance | kN/m | 12 | 7 | 12 | 11 |
| abrassion | mm^3 | 254 | 176 | 330 | 374 |
| Swelling properties | | | | | |
| degree of swelling | % | 2.2 | 1.8 | 2.1 | 1.6 |

In summary, the experimental results show that although the mechanical properties are largely the same there is a marked improvement in swelling behavior in boiling water when the polyol is produced in the presence of a hybrid catalyst.

The invention claimed is:

1. A process for synthesizing a polyetherester polyol, the process comprising copolymerizing an alkylene oxide with carbon dioxide, a cyclic compound of the following formula

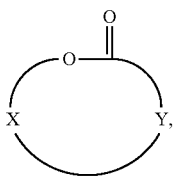

or both, in the presence of an initiator and a hybrid catalyst, wherein
the hybrid catalyst comprises a double metal cyanide complex catalyst and a co-catalyst,
the co-catalyst is at least one selected from the group consisting of a Lewis acid, an organo-tin carboxylate, a titanium compound, a metal alkoxide, and an aryloxide comprising aluminum, lithium, titanium, and lanthanide,
X is C=O or CR1R2,
wherein R1 and R2 are each independently H, alkyl, or aryl, and
Y is selected from the group consisting of —(CR3R4)m-, —(CR5=CR6)n-,

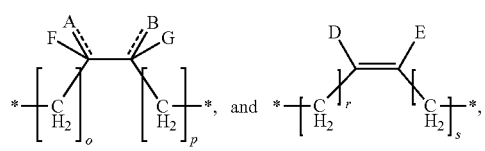

wherein
A and B are each independently hydrogen, methylene or a C2-C100 aliphatic compound, or A is

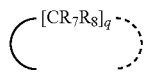

and B is a bond,
D and E are each independently hydrogen or a C1-C100 aliphatic compound,
or D is

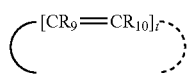

is a bond,
F and G are each independently hydrogen or are not present,
m is an integer of from 0 to 5,
n is an integer of from 0 to 5,
R3, R4, R5, R6, R7, R8, R9, and R10 are each independently hydrogen, methylene, alkyl, or aryl,
o, p, q, r, s, and t are each independently an integer of from 0 to 5, wherein the double metal cyanide complex catalyst is present in an amount of from 5 to 2000 ppm, and the co-catalyst is present in an amount of from 1 to 1000 ppm, each with respect to a total mass of the polyetherester polyol.

2. The process according to claim 1, wherein X is C=O.
3. The process according to claim 2, wherein Y is selected from the group consisting of —(CR3R4)m-, wherein m=2,
—(CR5=CR6)n-, wherein n=1,

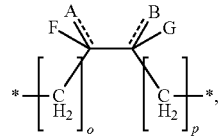

wherein
o and p are each 0, and
A and B are each independently a C16 aliphatic compound or a C18 aliphatic

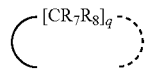

compound, or A is
and B is a bond,
wherein q=4, and R7 and R8 are each hydrogen, and

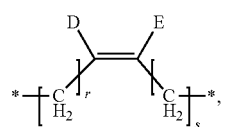

wherein
r and s are each 0,

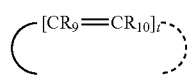

D and E are each hydrogen or D is
and E is a bond,
wherein t=2, and R9 and R10 are each hydrogen.

4. The process according to claim 3, wherein

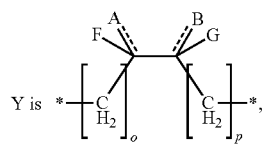

o and p are each 0,
A is hydrogen and B is methylene, or A is methylene and B is hydrogen,
F is hydrogen if A is hydrogen,
F is not present if A is methylene,
G is hydrogen if B is hydrogen, and
G is not present if B is methylene.

5. The process according to claim 1, wherein X is CR1R2.
6. The process according to claim 5, wherein R1 and R2 are each hydrogen, and Y is —(CR3R4)m-,
wherein m is 3 or 5, and
R3 and R4 are each hydrogen.

7. The process according to claim 1, wherein the co-catalyst is a compound catalyzing an esterification reaction, a compound catalyzing a transesterification reaction, or both.

8. The process according to claim 1, wherein the co-catalyst is a titanium alkoxide.

9. The process according to claim 1, wherein the double metal cyanide complex catalyst comprises at least one selected from the group consisting of Co—Zn, Fe—Zn, and Ni—Zn.

10. The process according to claim 9, wherein the double metal cyanide complex catalyst comprises Co-Zn having formula $Zn_3[Co(CN)_6]_2$.

11. The process according to claim 1, wherein the double metal cyanide complex catalyst is present in an amount of from 20 to 250 ppm, and the co-catalyst is present in an amount of from 1 to 100 ppm.

12. The process according to claim 1, wherein the double metal cyanide complex catalyst is present in an amount of from 50 to 150 ppm, and the co-catalyst is present in an amount of from 1 to 60 ppm.

13. The process according to claim 1, wherein the alkylene oxide is at least one selected from the group consisting of ethylene oxide, propylene oxide, butylene oxide, pentene oxide, cyclohexene oxide, glycidyl ether, glycidyl-(meth)crylate, ally glycidyl ether, phenyl glycidyl ether, butadiene monoxide, hexane oxide, stryrene oxide, glycidole, epichlorohydrin, propionic acid methylester oxide, and oxetane.

14. The process according to claim 13, wherein the alkylene oxide is at least one selected from the group consisting of ethylene oxide, propylene oxide, and 1,2-butylene oxide.

15. The process according to claim 1, wherein the cyclic compound is a cyclic ester compound,
wherein the cyclic ester compound is at least one selected from the group consisting of ε-caprolactone, δ-valerolactone, γ-butyrolactone, and β-methyl δ-valerolactone.

16. The process according to claim 1, wherein the cyclic compound is a cyclic anhydride,
wherein the cyclic anhydride is at least one selected from the group consisting of maleic anhydride, itaconic anhydride, succinic anhydride, phthalic anhydride, tetrahydrophthalic anhydride, diglycolic anhydride, and a derivative thereof.

17. The process according to claim 1, wherein the copolymerizing is at a temperature between 80 and 220° C.

18. The process according to claim 1, wherein the copolymerizing is at a temperature between 100 and 180° C.

19. The process according to claim 1, wherein the copolymerizing is at a temperature between 100 and 160° C.

* * * * *